UNITED STATES PATENT OFFICE.

JOHN C. BRADLEY, OF HAVERHILL, MASSACHUSETTS, ASSIGNOR OF ONE-HALF TO WILLIAM M. THOMPSON, OF HAVERHILL, MASSACHUSETTS.

FLAVORING COMPOUND.

1,285,555.   Specification of Letters Patent.   Patented Nov. 19, 1918.

No Drawing.   Application filed June 8, 1918.   Serial No. 238,929.

*To all whom it may concern:*

Be it known that I, JOHN C. BRADLEY, a citizen of the United States, and a resident of Haverhill, county of Essex, State of Massachusetts, have invented an Improvement in Flavoring Compounds, of which the following is a specification.

This invention relates to compounds for flavoring foods and, more particularly, to flavoring compounds in which oil of lemon is the flavoring ingredient.

Prior to my invention the flavoring compound known as lemon extract has consisted, in most instances, of oil of lemon and alcohol, a proportion frequently employed being 20% water, 80% alcohol and 5% oil of lemon.

The use of alcohol, as the diluent of oil of lemon, is objectionable for several reasons. Pure alcohol is, at the present time, very expensive, and its use in foods is objected to by many, on principle. Also, when a flavoring compound, of this composition, is employed, the flavoring is liable to "bake out". That is, when used in cake, for example, the heat causes evaporation of the alcohol, which carries off with it a substantial portion of the oil of lemon, so that either the food is not sufficiently flavored, or the quantity of the compound employed must be much greater than would otherwise be necessary.

The object of my invention is to provide a satisfactory substitute for the alcohol diluent, which will be less expensive than alcohol, which will not be objected to by those who would object to the use of alcohol, and will have a certain food value, and which will retain the lemon extract, in the food which has been flavored, when subjected to heat.

I accomplish this object by providing, as a diluent for the oil of lemon, a vegetable oil, preferably oil of cotton seed, in the proportion of approximately 25% oil of lemon, to 75% of the oil of cotton seed, although these proportions may be varied to a considerable extent without seriously affecting the desirable results secured, or departing from the spirit and scope of my invention, but a reduction of the proportion of oil of lemon to such an extent that the taste of the lemon extract would no longer strongly predominate, would be objectionable and not within the true spirit of the invention, in that the result would be cotton seed oil flavored with oil of lemon, rather than oil of lemon diluted with cotton seed oil.

The use of cotton seed oil as a diluent for oil of lemon is highly advantageous for various reasons:—

It is considerably less expensive than alcohol, and has a food value, in addition to the fact that it avoids the objection to the use of alcohol in food. It is of approximately the same specific gravity as oil of lemon and may be easily and thoroughly mixed therewith mechanically, and, when once mixed will not separate out when permitted to stand for an indefinite period. It will also, to a large degree, prevent "baking out", as it is not driven off by heat and will retain the oil of lemon in food which is subjected to baking temperatures, so that the quantity which it is necessary to use to secure the desired flavoring, is less than the quantity necessary with the alcoholic mixture, having a corresponding proportion of oil of lemon.

I claim:

1. A flavoring compound composed of oil of lemon diluted with a vegetable oil of approximately the same specific gravity.

2. A flavoring compound composed of oil of lemon diluted with oil of cotton seed.

3. A flavoring compound composed of oil of lemon diluted with oil of cotton seed in the proportions of approximately one part of the oil of lemon to three parts of the oil of cotton seed.

In testimony whereof I have signed my name to this specification.

JOHN C. BRADLEY.